Patented June 20, 1933

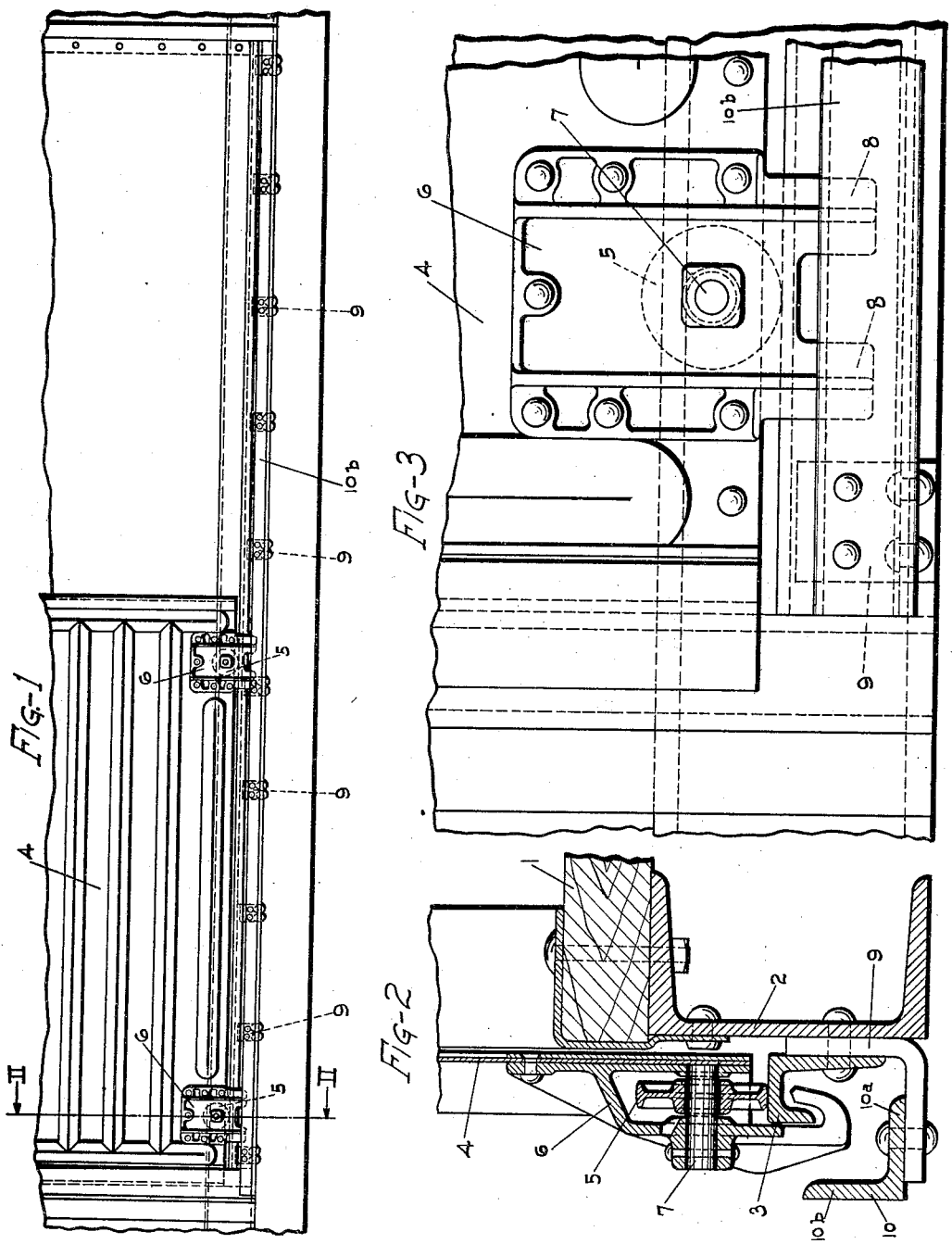

1,915,155

UNITED STATES PATENT OFFICE

CARL E. EKLIND AND KENNETH J. TOBIN, OF CHICAGO, ILLINOIS, ASSIGNORS TO CAMEL COMPANY, OF CHICAGO, ILLINOIS, A CORPORATION OF ILLINOIS

TRACK FENDER FOR HOUSE CAR DOORS

Application filed May 6, 1929. Serial No. 360,706.

This invention relates to a track fender for house car doors.

In many instances, the doors on house cars are supported upon their lower edges by means of rollers, which travel upon tracks which are secured to the lower sill. Many complaints have arisen on account of the damage done to these tracks by the backing-up of trucks and wagons or the like during the process of unloading the car.

This invention is designed to protect the car door track against such damage, and to this end, a fender has been provided which extends longitudinally of the track and protects the same from injury.

The invention comprises the novel structure and combination of parts hereinafter described and more particularly pointed out and defined in the appended claims.

In the accompanying drawing which illustrates a preferred embodiment of this invention and in which similar reference numerals refer to similar features in the different views:

Figure 1 is a fragmentary side elevational view of a house car illustrating the application of this invention.

Figure 2 is an enlarged fragmentary sectional view taken upon the line II—II of Figure 1.

Figure 3 is an enlarged fragmentary elevational view taken at the lower forward corner of the car door.

As shown on the drawing:

In the drawing, there is shown a fragment of a house car consisting of the floor 1 to which the side sill 2 is secured. To the side sill there is bolted or secured the door supporting track 3, which extends longitudinally of the car. The door of the car is indicated by the reference numeral 4, and this door carries a pair of rollers 5 which travels upon the track 3. These rollers are mounted in suitable roller housings 6, secured to the lower part of the door. Each roller housing 6 supports a small shaft 7 upon which the rollers are mounted for rotation. The roller housings are provided with depending hook guide members 8 which engage beneath the outer depending flange of the track 3 for the purpose of guiding and maintaining the door upon the track.

According to this invention, a plurality of angular brackets 9 are secured between the track 3 and the side sill 2. These brackets comprise a vertical flange which is attached between the track and the sill 2 and a horizontal flange which extends outwardly with respect to the door. A longitudinally extending fender 10 is secured to the horizontal flanges of the brackets 9. This fender consists of an angular member having a flange 10a which is secured to the horizontal flanges of the brackets 9 and an upstanding flange 10b which extends in parallel relation to the track and protects the same against damage or injury due to backing trucks against the side of the car or the like. The fender also serves to protect the lower portion of the door including the roller housings 6. Apparently it will be noted that the fender 10 not only extends the width of the doorway, but also extends rearwardly coextensive with the track 3. It will be noted that the supporting brackets 9 or the fender also serve to space the track 3 a sufficient distance from the sill 2, and as they are secured between the two, it will be evident that they are very rigidly supported and cannot readily work loose. Consequently, any thrust directed against the fender 10 will be absorbed by the side sill 2 and not by the track 3.

It will be appreciated that the vertical flange 10b of the fender will absorb any thrust arising from contact with trucks or the like and will transmit the same directly to the sill 2. It is therefore obvious that the fender 10 will fully protect the car door track against any ordinary injury that might arise through loading or unloading the car from vehicles. In addition, the fender will always serve to protect the track against damage or injury that might occur from other causes.

We are aware that many changes may be made, and numerous details of construction may be varied through a wide range without departing from the principles of this invention, and we therefore do not purpose limiting the patent granted hereon, otherwise than necessitated by the prior art.

We claim as our invention:

1. In a house car having a side sill, a track secured to said side sill, brackets secured between said track and sill, said brackets having horizontal flanges and a fender having a horizontal flange attached to the horizontal flanges of said brackets, and having a vertical flange in spaced relation with said track for protecting the same.

2. In a house car having a lower side sill, a track secured to said sill and adapted for supporting a door, brackets secured to said side sill and an angular fender secured to said brackets and extending in spaced parallel relation with the outer portion of said track.

3. In a house car having a lower side sill, a track attached to said sill, brackets having vertical portions attached to said sill and horizontal portions extending outwardly from said sill, and a fender having a horizontal portion attached to said brackets and a vertical portion extending in spaced parallel relation to the outer portion of said track.

In testimony whereof, we have hereunto subscribed our names.

CARL E. EKLIND.
KENNETH J. TOBIN.